(12) United States Patent
Cho et al.

(10) Patent No.: US 11,170,955 B2
(45) Date of Patent: Nov. 9, 2021

(54) INPUT APPARATUS FOR CONTROLLING VEHICLE DEVICES

(71) Applicants: HYUNDAI MOTOR COMPANY, Seoul (KR); KIA MOTORS CORPORATION, Seoul (KR); MOBASE electronics co., ltd., Suwon-si (KR)

(72) Inventors: Woo Hyoung Cho, Suwon-si (KR); Kyu Ha Yoo, Gunpo-si (KR); Jung Joon Park, Suwon-si (KR); Byoung Wook Kim, Gunpo-si (KR); Beom Yeol Baek, Suwon-si (KR)

(73) Assignees: HYUNDAI MOTOR COMPANY, Seoul (KR); KIA MOTORS CORPORATION, Seoul (KR); MOBASE ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/822,200

(22) Filed: Mar. 18, 2020

(65) Prior Publication Data

US 2021/0098209 A1 Apr. 1, 2021

(30) Foreign Application Priority Data

Sep. 26, 2019 (KR) .......... 10-2019-0119149

(51) Int. Cl.
*H01H 13/58* (2006.01)
*B60K 37/06* (2006.01)

(52) U.S. Cl.
CPC .......... *H01H 13/585* (2013.01); *B60K 37/06* (2013.01)

(58) Field of Classification Search
CPC .... H01H 13/585; H01H 25/06; H01H 25/065; H01H 19/04; H01H 19/10; H01H 19/11; H01H 19/14; H01H 25/008; H01H 3/50; H01H 3/08; H01H 13/14; H01H 221/01; H01H 25/006; H01H 13/58; B60K 37/06
USPC .............................................. 200/4, 6 A, 6 R
See application file for complete search history.

(56) References Cited

U.S. PATENT DOCUMENTS

| | | | | |
|---|---|---|---|---|
| 8,110,766 B2* | 2/2012 | Iordache | ................ | H01H 19/04 200/564 |
| 2009/0071808 A1* | 3/2009 | Kang | .................. | H01H 25/065 200/336 |
| 2012/0055764 A1* | 3/2012 | Lekmine | ................ | G05G 1/105 200/4 |
| 2012/0292161 A1* | 11/2012 | Matsumoto | .......... | H01H 25/065 200/4 |

* cited by examiner

*Primary Examiner* — Lheiren Mae A Caroc
(74) *Attorney, Agent, or Firm* — Morgan, Lewis & Bockius LLP (57) ABSTRACT

An input apparatus for a vehicle includes: a housing mounted on the vehicle; a substrate disposed inside the housing; a push button device disposed in the housing to be pressed; a dial device arranged and configured to be rotated about the push button device, being non-peristaltic when the push button device is pressed, and maintained in a posture with respect to the housing, a first sensing device disposed on the substrate to sense pressing of the push button device; and a second sensing device disposed on the substrate to sense rotation of the dial device.

9 Claims, 12 Drawing Sheets

INPUT APPARATUS FOR CONTROLLING VEHICLE DEVICES

CROSS-REFERENCE TO RELATED APPLICATION

This application claims the benefit of priority to Korean Patent Application No. 10-2019-0119149, filed in the Korean Intellectual Property Office on Sep. 26, 2019, the entire contents of which are incorporated herein by reference.

TECHNICAL FIELD

The present disclosure relates to an input apparatus for a vehicle, and more particularly, to an input apparatus for a vehicle, which has a simplified structure and an improved productivity.

BACKGROUND

Recently, as various multimedia devices are used for a vehicle and the functions of the multimedia devices are increased, a dial controller has been used to control a vehicle through a push operation and a rotation operation.

When an operation of searching a list or of subsequently changing values is required, the dial controller performs such operations for a shorter period of time, improves the convenience of a user, and has an intuitive control operation, as compared to a button-type input device.

As a conventional dial controller requires an encoder switch having the function of a push switch to sense a push operation and a rotation operation, the structure of the conventional dial controller is complicated and the manufacturing cost of the conventional dial controller is increased.

Furthermore, the conventional dial controller has a limitation in a design because the entire portion of the dial controller is configured to pressed or rotated in both the rotation operation as well as the push operation (pressing operation). Accordingly, a consumer demand, which is rapidly changed, is not satisfied.

In particular, a switch knob having a symbol is mounted on the upper most end of the dial controller. In this case, when the dial controller rotates, as the switch knob is rotated together, even the symbol is rotated. Accordingly, the productivity may be degraded, and the satisfaction of the user may be degraded.

Accordingly, recently, various studies and researches have been performed to simplify the structure of an input device for a vehicle and the value of the productivity, but insufficient. Therefore, the development for the studies and the researches has been required.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides an input apparatus for a vehicle, which has a simplified structure and an improved productivity.

Another aspect of the present disclosure is to perform a push operation and a rotation operation independently and separately from each other in an input apparatus.

Another aspect of the present disclosure is to improve a design characteristic and contribute to a high-quality product.

According to an aspect of the present disclosure, an input apparatus for a vehicle, includes: a housing mounted on the vehicle; a substrate mounted inside the housing; a push button device disposed in the housing to be pressed; a dial device arranged and configured to be rotated about the push button device, being non-peristaltic when the push button device is pressed, and having a posture maintained with respect to the housing; a first sensing device disposed on the substrate to sense pressing of the push button device; and a second sensing device disposed on the substrate to sense rotation of the dial device.

This is provided to simplify a structure and improve the productivity.

In other words, the conventional dial controller has a limitation in a design because the entire portion of the dial controller is configured to pushed or rotated in both the rotation operation as well as the push operation (pressing operation). Accordingly, a consumer demand, which is rapidly changed, is not satisfied.

In particular, a switch knob having a symbol is mounted on the upper most end of the dial controller. In this case, when the dial controller rotates, as the switch knob is rotated together, even the symbol is rotated. Accordingly, the productivity is degraded, and the satisfaction of the user is degraded.

However, according to the preset disclosure, a push operation and a rotation operation of an input apparatus independently and separately from each other, thereby improving a design characteristic and contributing to the high-quality product.

In addition, according to an exemplary embodiment of the present disclosure, a push operation and a rotation operation of an input apparatus independently and separately from each other, thereby minimizing the erroneous operation caused by an unintentional push operation or rotation operation.

In other words, conventionally, when the rotational force is applied during the push operation of the input apparatus, a function control is performed through the push operation while a function control is performed through the rotation operation.

However, according to an exemplary embodiment of the present disclosure, even if the unintentional rotational force is applied to the push button device, the push button device may perform only the function control resulting from the push operation (the dial device may perform only the function control resulting from the rotation operation), the erroneous operation caused by the erroneous handling may be minimized, and the stability and the reliability are improved.

According to an exemplary embodiment of the present disclosure, the push button device includes a push button support disposed on the substrate and coupled to the housing, and a push button body coupled to the push button support movably in a vertical direction and exposed to an outside of the housing.

A guide rib may be formed at a lower portion of the push button body, and the push button support has a guide groove to movably receive the guide rib in a vertical direction. As described above, as the push button body is moved with respect to the push button support in the vertical direction in the state that the guide rib is received in the guide groove, the vertical movement of the push button body with respect to the push button support is stably supported, and the horizontal movement (or radial flow) of the push button body is prevented.

Further, a push knob may be coupled to an upper end of the push button body and a symbol, which is previously defined, may be formed on a top surface of the push knob.

The first sensing device may include a tact switch. The push button body may be formed at a lower end thereof with a push protrusion. When the push knob is pressed, the push protrusion pushes the tact switch to sense the pressing of the push button device.

For reference, according to an exemplary embodiment of the present disclosure, the dial device is in the non-peristaltic state with respect to the push button device, which refers that the pressing operation of the push button device is not performed together with the rotation operation of the dial device, but performed independently from the rotation operation of the dial device.

In other words, when the push button device is pressed, only the push button device is independently moved in the vertical direction, in the state that the height (the height in the pressing direction), the rotational position, and the disposal angle of the dial device is maintained with respect to the housing without change.

Similarly, when the dial device is rotated, only the dial device is independently rotated, in the state that the height, the rotational position, and the disposal angle of the push button device are maintained with respect to the housing without change.

According to an exemplary embodiment of the present disclosure, the dial device includes a dial body formed to surround a circumference of the push button body, and disposed above the push button support, and a dial support coupled to the dial body to surround a circumference of the push button support and rotatably disposed inside the housing.

The dial support may include a magnet, the second sensing device includes hall sensors spaced apart from each other in a circumferential direction of the dial support, and the hall sensor senses the rotation of the dial device by sensing the magnet.

According to an exemplary embodiment of the present disclosure, the input apparatus for the vehicle includes a rotation restriction device to restrict the dial support from being rotated about the housing to a specific extent or more.

As described above, as the rotation restriction device is provided, the dial support is prevented from being excessively rotated and the rotation of the dial support is stably performed only within an allowed section.

For example, the rotation restriction device includes a locking groove formed in an outer circumferential surface of the dial support in the circumferential direction of the dial support, and a stopper protrusion formed on an inner surface of the housing, received in the locking groove, and selectively locked to one end or an opposite end of the locking groove corresponding to the rotation of the dial support.

According to an exemplary embodiment of the present disclosure, the input apparatus includes an elastic support device to elastically support the rotation of the dial support about the housing.

The elastic support device may automatically return the dial support to the initial position, when the force (force to rotate the dial body coupled to the dial support) applied to rotate the dial support is released.

As described above, as the rotation of the dial support is elastically supported, the rotation of the dial device is released without manually returning the dial device, which is rotated, to the initial position, and the dial support is automatically returned to the initial position, so the user convenience is provided.

For example, the elastic support device may include a cam groove including a first inclined surface and a second inclined surface connected with an end portion of the first inclined surface, and formed by recessing the dial support, a contact member mounted in the housing to be able to contact with the first inclined surface or the second inclined surface corresponding to a rotation direction of the dial support, and an elastic member to elastically support the contact member such that the contact member elastically contacts with the first inclined surface and the second inclined surface.

The technical problems to be solved by the present disclosure are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to accompanying drawings, and the present disclosure is not limited thereto. For reference, in the following description, the same reference numeral will be actually assigned to the same components. According to this principle, the description of the same component assigned with the same reference numeral in a different drawing will be employed, and the duplicated description considered as being obvious to those skilled in the art will be omitted.

Figure 1:
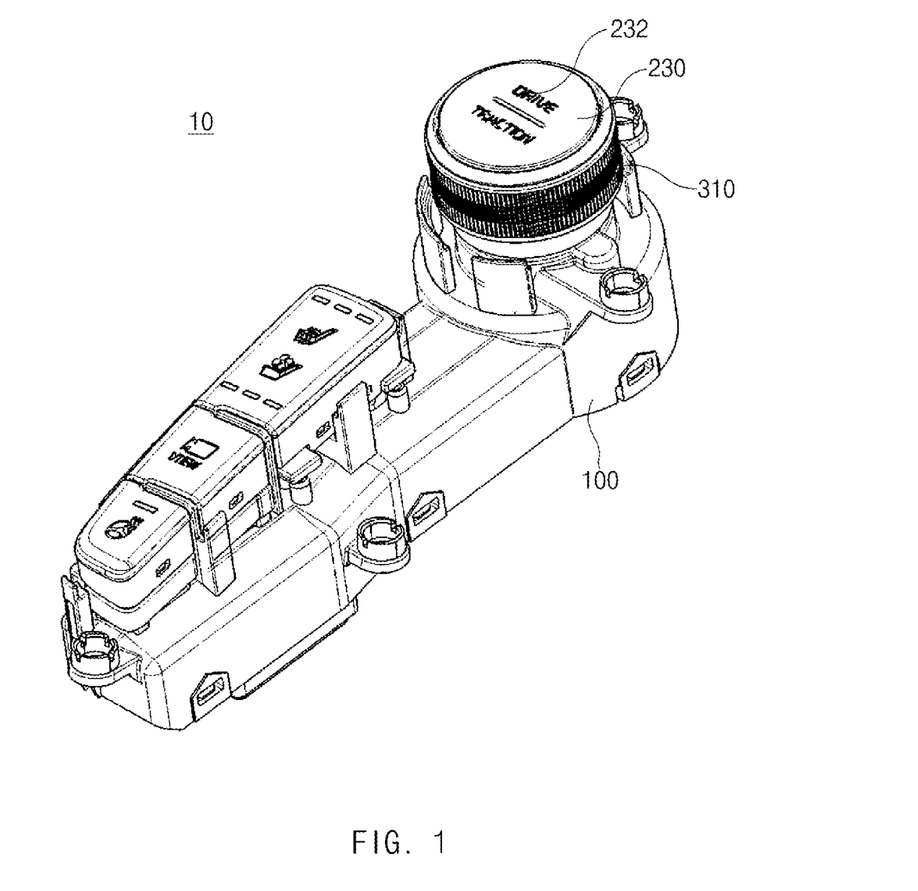
FIG. 1 is a perspective view illustrating a input apparatus, according to an exemplary embodiment of the present disclosure.
Figure 2:
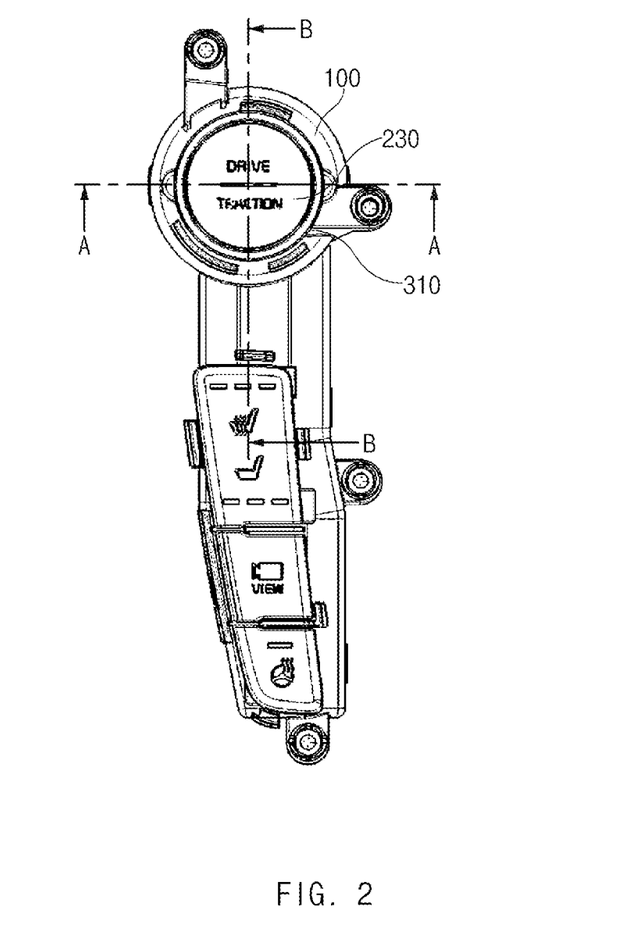
FIG. 2 is a plan view illustrating a input apparatus, according to an exemplary embodiment of the present disclosure.
Figure 3:
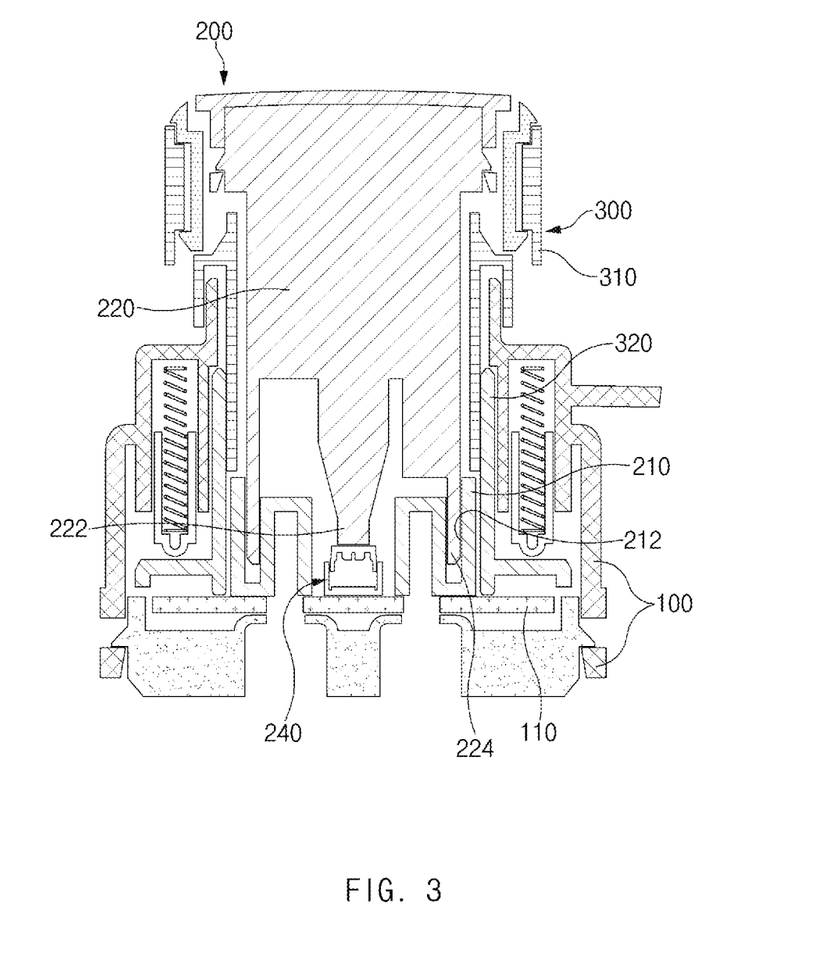
FIG. 3 is a sectional view taken along line A-A of FIG. 2.
Figure 4:
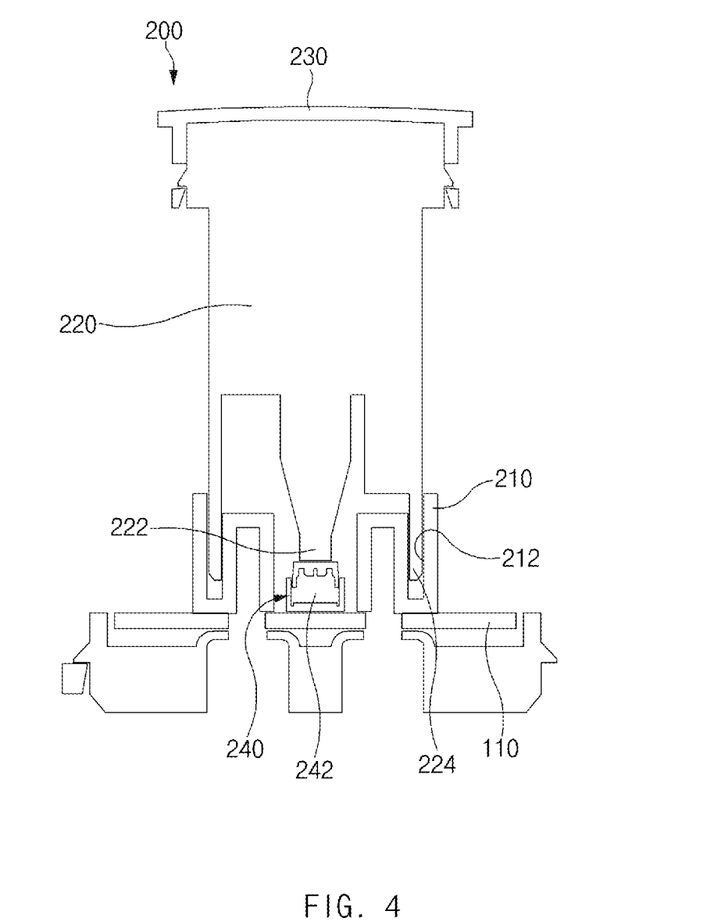
FIG. 4 and FIG. 5 illustrates a structure and an operating structure of a push button device in a input apparatus for a vehicle, according to an exemplary embodiment of the present disclosure.
Figure 5:
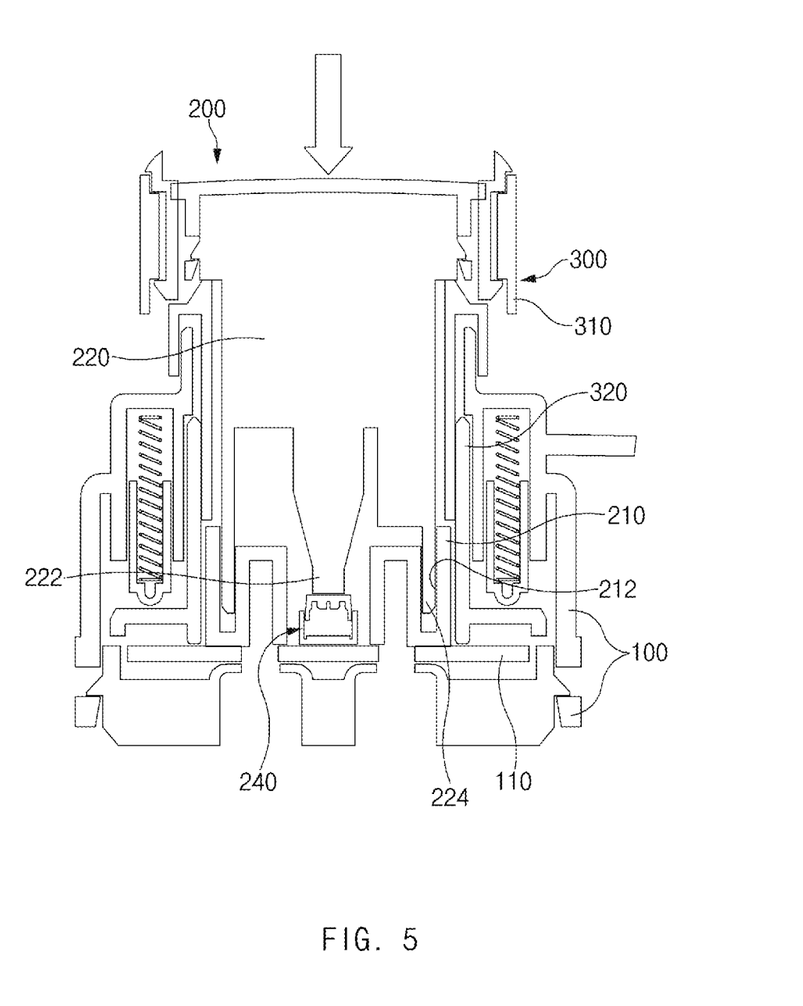
Figure 6:
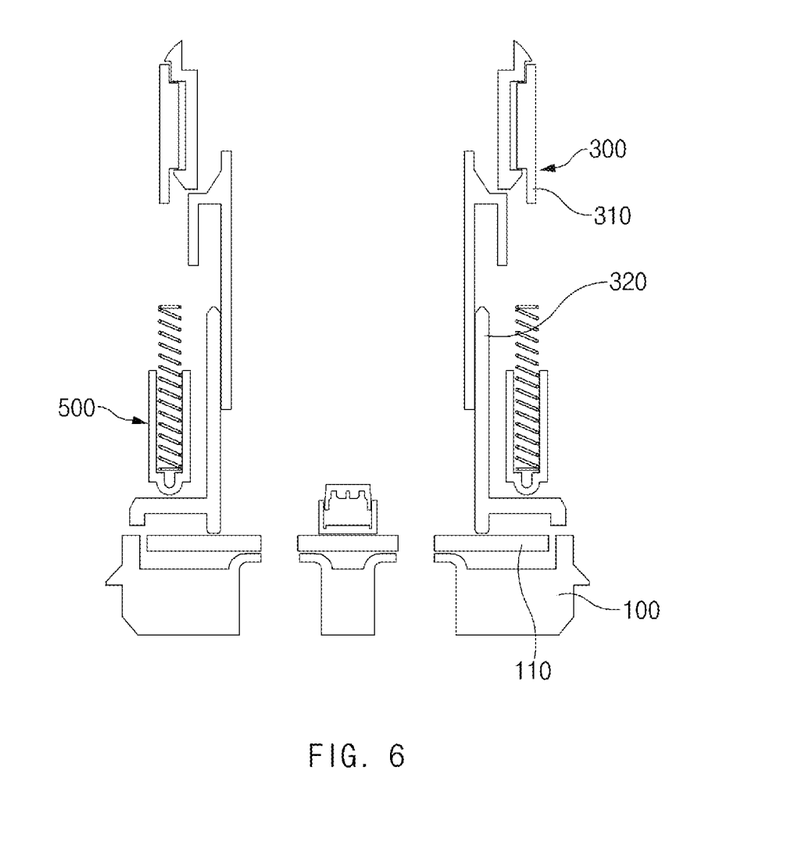
FIG. 6 is a view illustrating a dial device in the input apparatus for a vehicle, according to an exemplary embodiment of the present disclosure.
Figure 7:
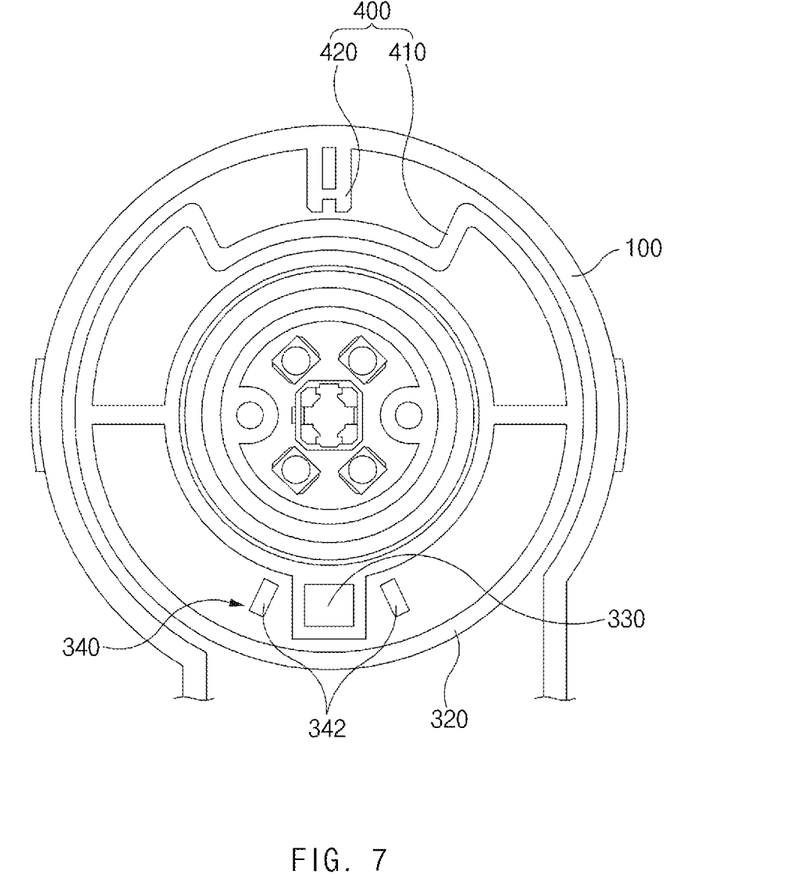
FIG. 7 is a sectional view taken along line B-B of FIG. 2.
Figure 8:
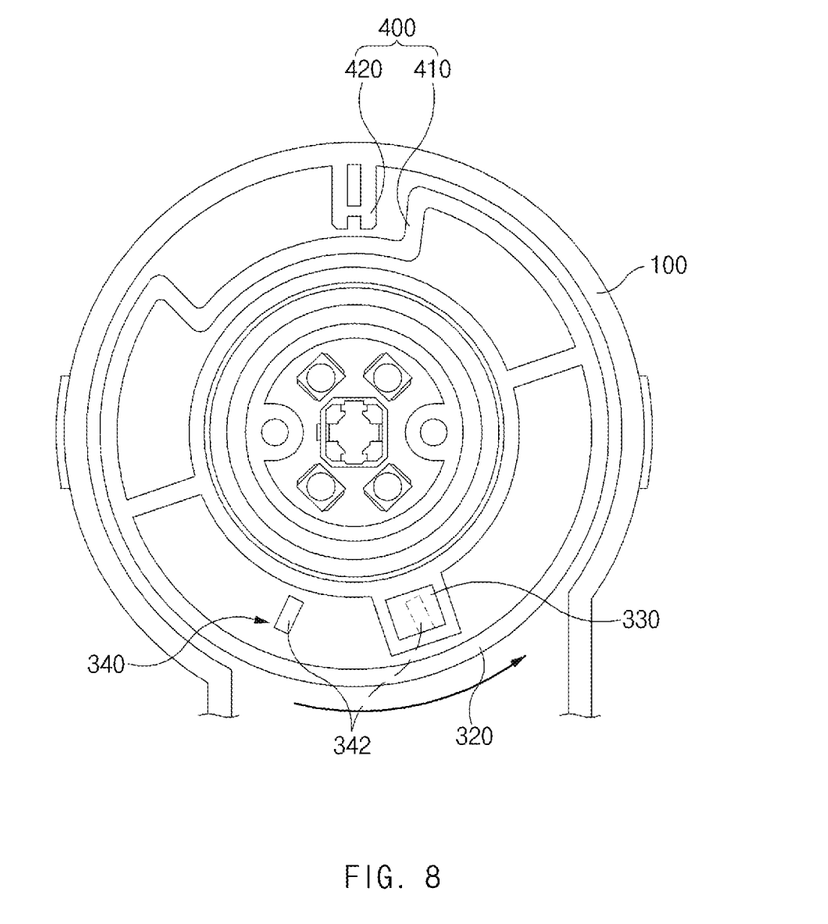
FIG. 8 is a view illustrating a magnet and a second sensing device in the input apparatus, according to an exemplary embodiment of the present disclosure.
Figure 9:
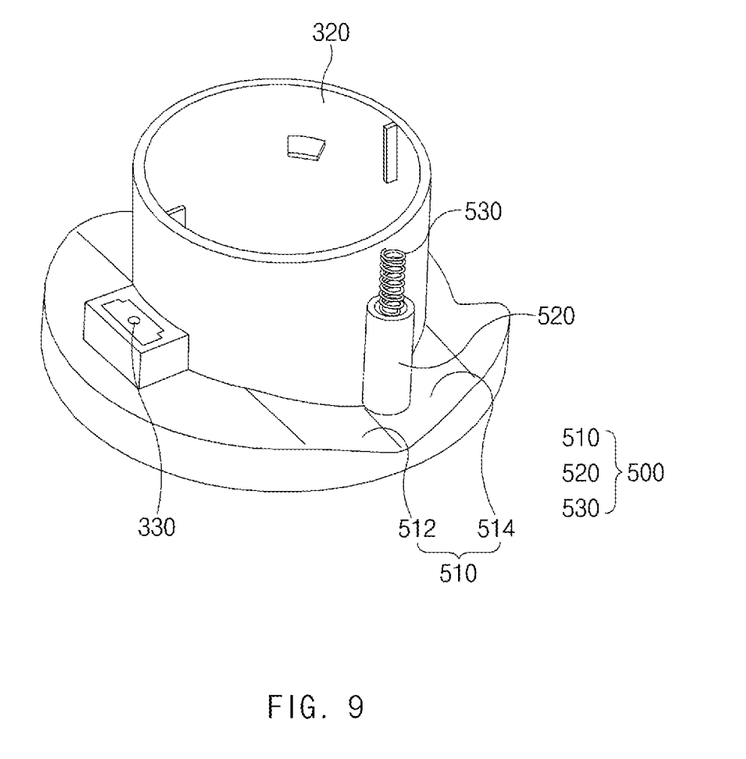
FIG. 9 is a perspective view illustrating an elastic support device, in the input apparatus, according to an exemplary embodiment of the present disclosure.
Figure 10:
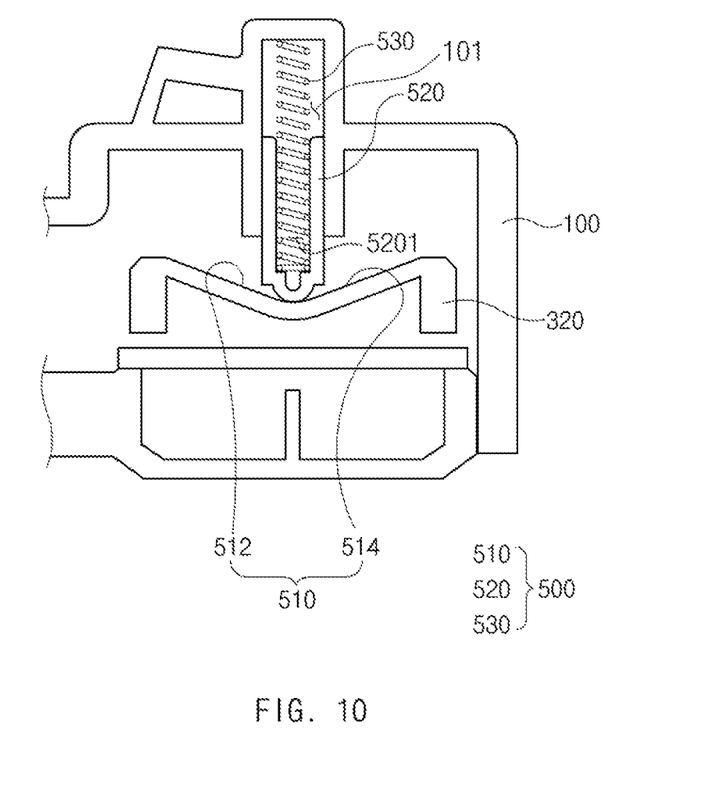
FIGS. 10 and 11 are views illustrating the operating structure of the elastic support device in the input apparatus, according to an exemplary embodiment of the present disclosure.
Figure 11:
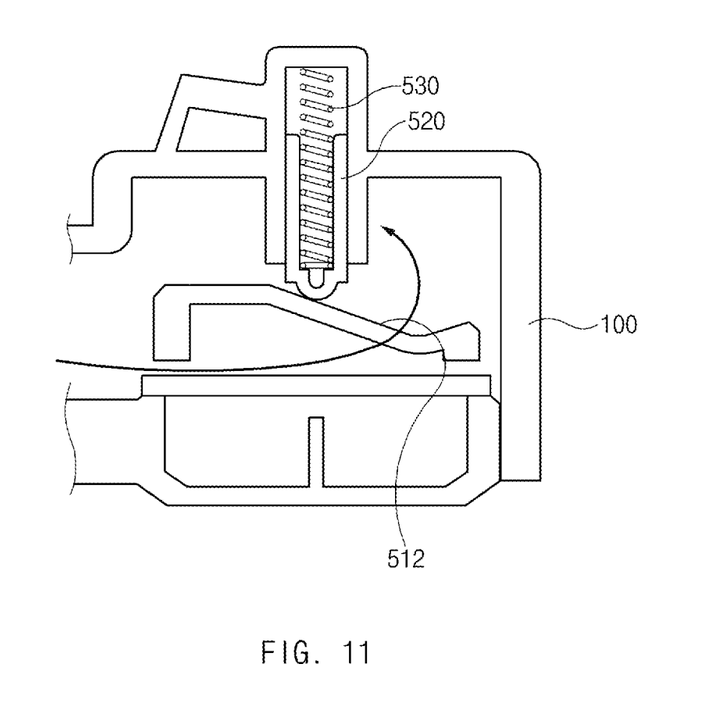
Figure 12:
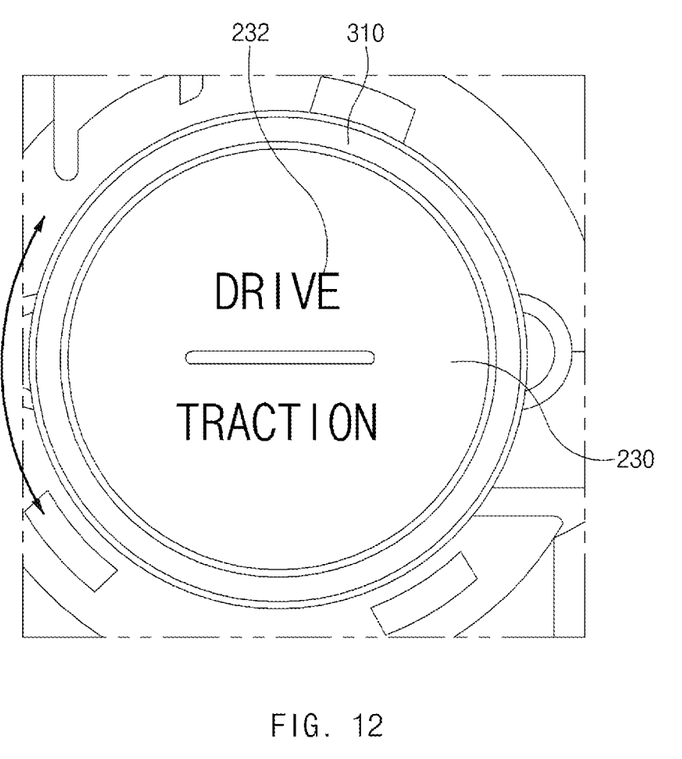
FIG. 12 is a view illustrating the operating structure of a dial device in the input apparatus, according to an exemplary embodiment of the present disclosure.

FIG. 1 is a perspective view illustrating a input apparatus, according to an exemplary embodiment of the present disclosure, FIG. 2 is a plan view illustrating an input apparatus, according to an exemplary embodiment of the present disclosure, FIG. 3 is a sectional view taken along line A-A of FIG. 2, FIG. 4 and FIG. 5 illustrates a structure and an operating structure of a push button device in a input apparatus for a vehicle, according to an exemplary embodiment of the present disclosure, FIG. 6 is a view illustrating a dial device in the input apparatus, according to an exemplary embodiment of the present disclosure, FIG. 7 is a sectional view taken along line B-B of FIG. 2, FIG. 8 is a view illustrating a magnet and a second sensing device in the input apparatus, according to an exemplary embodiment of the present disclosure, FIG. 9 is a perspective view illustrating an elastic support device, in the input apparatus, according to an exemplary embodiment of the present disclosure, FIGS. 10 and 11 are views illustrating the operating structure of the elastic support device in the input apparatus, according to an exemplary embodiment of the present disclosure, and FIG. 12 is a view illustrating the operating structure of a dial device in the input apparatus, according to an exemplary embodiment of the present disclosure.

Referring to FIGS. 1 to 11, according to an exemplary embodiment of the present disclosure, an input apparatus 10 for a vehicle includes a housing 100 mounted on the vehicle, a substrate 110 mounted inside the housing 100, a push button device 200 mounted in the housing 100 and to be pressed, a dial device 300 mounted to be rotated about the push button device 200, non-peristaltic when the push button device 200 is pressed, and having a posture maintained with respect to the housing 100, a first sensing device 240 provided on the substrate 110 to sense pressing of the push button device 200, and a second sensing device 340 provided on the substrate 110 to sense rotation of the dial device 300.

For reference, according to the present disclosure, the input apparatus 10 may be used to control various functions, such as Audio Video Navigation (AVN) and heater controlling, of a vehicle, but the preset disclosure is not limited to the type of a vehicle function controlled by the input apparatus 10.

The housing 100 is formed to have an inner space and mounted on the vehicle.

For example, the housing 100 may be mounted in a console area of the vehicle. If necessary, the housing may be mounted in another position of the vehicle. In other words, the mounting position of the housing 100 may be varied depending on requirements and design specifications.

In more detail, the housing 100 includes a lower housing (not illustrated) and an upper housing (not illustrated) coupled to each other to define a receiving space.

The substrate 110 is mounted inside the housing 100 and various components may be mounted on the substrate 110 to perform a switch function or a control operation.

Referring to FIGS. 3 to 5, the push button device 200 is mounted in the housing 100 such that the push button device 200 is able to be pressed.

For example, the push button device 200 includes a push button support 210 disposed on the substrate 110 and coupled to the housing 100, and a push button body 220 coupled to the push button support 210 movably in a vertical direction and exposed to the outside of the housing 100.

The push button support 210 may be formed to have various shapes and structures depending on requirements and a design specification. For example, the push button support 210 may be formed to have a circular sectional shape.

The push button body 220 is coupled to the push button support 210 movably in the vertical direction such that an upper end portion of the push button body 220 is exposed to the outside of the housing 100. For example, the push button body 220 may have a circular sectional shape that is able to be received in the push button support 210.

The push button body 220 may be provided at a lower portion thereof with a guide rib 224 formed along in a circumferential direction of the push button body 220, and the push button support 210 may have a guide groove 212 to movably receive the guide rib 224 in the vertical direction.

As described above, as the push button body 220 is moved with respect to the push button support 210 in the vertical direction in the state that the guide rib 224 is received in the guide groove 212, the vertical movement of the push button body 220 with respect to the push button support 210 is stably supported, and the horizontal movement (or radial flow) of the push button body 220 is prevented.

According to an exemplary embodiment of the present disclosure, although the above description has been made in that the push button support 210 and the push button body 220 have circular sectional shapes by way of example, the push button support 210 and the push button body 220 may be formed to have polygonal sectional shapes (e.g., a rectangular sectional shape) or other different sectional shapes.

Further, a push knob 230 may be coupled to an upper end of the push button body 220 and a symbol 232, which is previously defined, may be formed on a top surface of the push knob 230.

In this case, it is defined that the symbol 232 includes at least one of a figure, a character, a symbol, or a sign.

For example, the push knob 230 may be integrally coupled to the upper end of the push button body 220 in a snap fit coupling scheme, and may be configured to be moved in the vertical direction together with the push button body 220 in a push operation.

The first sensing device 240 is provided on the substrate 110 to sense the pressing of the push button device 200.

The first sensing device 240 may include various switches or various sensors to sense the pressing of the push button device 200. For example, the first sensing device 240 may include a tact switch 242 (or a push button switch).

As described above, as the pressing of the push button device 200 is sensed by the tact switch instead of an encoder switch, the structure may be simplified and the manufacturing cost may be reduced.

In addition, the push button body 220 is formed at a lower end thereof with a push protrusion 222 corresponding to the tact switch 242. When the push knob 230 is pressed, the push button body 220 and the push protrusion 222 are moved down to push the tact switch 242, thereby sensing the pressing of the push button device 200.

Referring to FIGS. 3 and 6, the dial device 300 is mounted to be rotated about the push button device 200, and is non-peristaltic to maintain the posture thereof with respect to the housing 100 when the push button device 200 is pressed.

In this case, the dial device 300 is in the non-peristaltic state with respect to the push button device 200, which refers that the pressing operation of the push button device 200 is not performed together with the rotation operation of the dial device 300, but performed independently from the rotation operation of the dial device 300.

In other words, when the push button device 200 is pressed, only the push button device 200 is independently moved in the vertical direction, in the state that the height (the height in the pressing direction), the rotational position, and the disposal angle of the dial device 300 is maintained with respect to the housing 200 without change.

Similarly, when the dial device 300 is rotated, only the dial device 300 is independently rotated, in the state that the height, the rotational position, and the disposal angle of the push button device 200 are maintained with respect to the housing 200 without change.

Therefore, even if the dial device 300 is rotated, the push knob 230 coupled to the push button body 220 is not rotated and maintains the posture with respect to the housing 100. Accordingly, the symbol 232 formed on the push knob 230 maintain a specific posture (for example, the posture that the upper portion of the symbol faces the front portion of the vehicle) (see FIG. 12).

The dial device 300 may be formed in various structures that are rotatable about the push button device 200, but the present disclosure is not limited thereto.

For example, the dial device 300 includes a dial body 310 formed to surround the push button body 220 and disposed above the push button support 210, and a dial support 320 coupled to the dial body 310 to surround the push button support 210 and disposed rotatably inside the housing 100.

The dial body 310 is formed in the shape of a hollowed cylinder to surround the push button body 220 and disposed above the push button support 210 while being spaced apart from the push button support 210. A grip portion (not illustrated) in the roughness structure may be formed on the circumferential surface of the dial body 210 in a circumferential direction of the dial body 210 to improve the grip sensation of the user.

For reference, the dial body 310 may include only one component, or may include the assembly of two or more components, but the present disclosure is not limited by the number of components included in the dial body 310 and the structure of the dial body 310.

The dial support 320 is formed in the shape of a hollowed cylinder to surround the circumference of the push button support 210, and disposed rotatably inside the housing 100. The dial body 310 is coupled to the upper portion of the dial support 320.

As the dial body 310 is rotated, the dial body 310 and the dial support 320 are rotated integrally with each other. Even if the dial device 300 is rotated, the posture of the push button device 200 is maintained with respect to the housing 100 without change.

The second sensing device 340 is provided on the substrate 110 to sense the rotation of the dial device 300.

The second sensing device 340 may include various switches or various sensors to sense the rotation of the dial device 300, but the present disclosure is not limited to the type of the second sensing device 340 and the sensing scheme of the second sensing device 340.

For example, the dial support 320 includes a magnet 330, and the second sensing device 340 includes hall sensors 342 mounted on the substrate 110 while being spaced apart from each other in a circumferential direction of the dial support 320. The following description will be made regarding that the hall sensors 342 are mounted at one side clockwise from the magnet 330 and at one side counterclockwise from the magnet 330.

Although the magnet 330 is not overlapped with the hall sensors 342 at the initial state (the state that the rotational force is not applied) of the dial device 300, when the dial support 320 rotates clockwise or counterclockwise, the magnet 330 is provided to be overlapped with the hall sensors 342. When the magnet 330 is provided to be overlapped with the upper portion of the hall sensor 342, the hall sensors 342 sense the magnet 330, thereby sensing the rotation of the dial device 300.

Referring to FIG. 7, according to an exemplary embodiment of the present disclosure, the input apparatus 10 includes a rotation restriction device 400 to restrict the dial support 320 from being rotated about the housing 100 to a specific extent or more.

As described above, as the rotation restriction device 400 is provided, the dial support 320 is prevented from being excessively rotated and the rotation of the dial support 320 is stably performed only within an allowed section.

The rotation restriction device 400 may have various structures to restrict the dial support 320 from being rotated about the housing 100 to the specific extent or more.

For example, the rotation restriction device 400 includes a locking groove 410 formed in an outer circumferential surface of the dial support 320 in the circumferential direction of the dial support 320, and a stopper protrusion 420 formed on an inner surface of the housing 100, received in the locking groove 410, and selectively locked to one end or an opposite end of the locking groove 410 corresponding to the rotation of the dial support 320.

The dial support 320 is formed in the outer circumferential surface thereof with the locking groove 410 which is recessed in an arc shape, and the housing 100 is formed on the inner surface thereof with the stopper protrusion 420 selectively locked to one end or an opposite end of the locking groove 410 corresponding to the rotation of the dial support 320.

For example, referring to FIG. 8, when the dial support 320 is rotated to a specific extent or more counterclockwise in the state that the stopper protrusion 420 is received in the locking groove 410, the stopper protrusion 420 is locked to one end (the right end of the locking groove when viewed from FIG. 8) of the locking groove 410, thereby restricting the rotation of the dial support 320.

To the contrast, referring to FIG. 9, when the dial support 320 is rotated to a specific extent or more clockwise in the state that the stopper protrusion 420 is received in the locking groove 410, the stopper protrusion 420 is locked to the opposite end (the left end of the locking groove when viewed from FIG. 8) of the locking groove 410, thereby restricting the rotation of the dial support 320.

In addition, referring to FIGS. 9 and 11, according to an exemplary embodiment of the present disclosure, the input apparatus 10 includes an elastic support device 500 to elastically support the rotation of the dial support 320 about the housing 100.

The elastic support device 500 may automatically return the dial support 320 to the initial position, when the force (force to rotate the dial body coupled to the dial support) applied to rotate the dial support 320 is released.

As described above, as the rotation of the dial support 320 is elastically supported, the rotation of the dial device 300 is released without manually returning the dial device 300, which is rotated, to the initial position, and the dial support 320 is automatically returned to the initial position, so the user convenience is provided.

The elastic support device 500 may be formed in various structures to elastically support the rotation of the dial support 320 about the housing 100, and the present disclosure is not limited by the structure of the elastic support device 500.

The elastic support device 500 includes a cam groove 510 including a first inclined surface 512 and a second inclined surface 514 connected with an end portion of the first inclined surface, and formed by recessing the dial support 320, a contact member 520 mounted in the housing 100 to be able to contact with the first inclined surface 512 or the second inclined surface 514 corresponding to the rotation direction of the dial support 320, and an elastic member 530 to elastically support the contact member 520 such that the contact member 520 elastically contacts with the first inclined surface 512 and the second inclined surface 514.

The dial support 320 is formed at a lower end thereof with a flange part (not illustrated) having an expanded diameter, and the cam groove 510 is formed in the top surface of the flange part to be recessed.

More particularly, the cam groove 510 may be formed in the substantially V shape to continuously connect the first inclined surface 512 with the second inclined surface 514.

The contact member 520 is mounted on the inner surface of the housing 100 to be movable in a direction (for example, the vertical direction) of contact with and being spaced apart from the first inclined surface 512 and the second inclined surface 514.

The housing 100 is formed in the inner surface thereof with a dial guide groove 101 and the contact member 520 is received in the dial guide groove 101 to be movable in the vertical direction.

The elastic member 530 is provided such that the vertical movement of the contact member 520 to the housing 100 is elastically supported, and the contact member 520 elastically contacts with the first inclined surface 512 and the second inclined surface 514 by the elastic member 530.

For example, the elastic member 530 may include a spring member, and may be received inside the dial guide groove 101 and a groove 5201 vertically formed at the contact member 520 to be interposed between the housing 100 and the contact member 520. If necessary, the elastic member 530 may include other elastic substances to elastically support the movement of the contact member with respect to the housing, and the present disclosure is not limited by the type and the structure of the elastic member.

Referring to FIG. 10, the contact member 520 is disposed at a boundary portion (inflection point) of the first inclined surface 512 and the second inclined surface 514 in the state that the dial device 300 is in the initial state (the state that the rotational force is not applied). In this case, since the contact member 520 is elastically supported by the elastic member 530, the dial support 320, the state that the dial support 320 is disposed at the initial position may be elastically supported.

Thereafter, when the dial body 310 is rotated, the dial support 320 coupled to the dial body 310 is rotated inside the housing 100. As the dial support 320 is rotated about the housing 100, the contact member 520 moves along the first inclined surface 512 or the second inclined surface 514.

For example, referring to FIG. 11, when the dial support 320 is rotated about the housing counterclockwise through rotation action, the contact member 520 moves along the first inclined surface 512 while compressing the elastic member 530. When the force of rotating the dial body 310 is released in the state that the contact member 520 is moved to the upper portion of the first inclined surface 512 along the first inclined surface 512, the elastic member 530 is recovered while the contact member 520 is moved along the first inclined surface 512 to rotate the dial support 320 counterclockwise. Accordingly, the dial support 320 may be disposed at the initial position (the contact member is interposed at the boundary portion between the first inclined surface and the second inclined surface).

In the same manner, when the dial support 320 is rotated about the housing 100 clockwise, the contact member 520 is moved along the second inclined surface 514 while compressing the elastic member 530. When the force of rotating the dial body 310 is released in the state that the contact member 520 is moved to the upper portion of the second inclined surface 514 along the second inclined surface 514, the elastic member 530 is recovered while the contact member 520 is moved along the second inclined surface 514 to rotate the dial support 320 clockwise, thereby disposing the dial support 320 at the initial position again.

As described above, according to the present disclosure, the structure may be simplified, and the productivity may be improved.

In addition, according to the present disclosure, the push operation and the rotation operation may be performed independently and separately from each other in the input apparatus.

In addition, according to the present disclosure, the erroneous operation resulting from the erroneous action may be minimized, and the stability and the reliability may be improved.

In addition, according to the present disclosure, the design characteristic may be improved, and the product value may be improved.

According to the present disclosure, the contribution to the high-quality product may be made, and the satisfaction of a consumer may be improved.

Although an exemplary embodiment of the present disclosure has been described for illustrative purposes, those skilled in the art will appreciate that various modifications, and substitutions are possible, without departing from the scope and spirit of the present disclosure as disclosed in the accompanying claims.

What is claimed is:

1. An input apparatus for a vehicle, comprising:
   a housing mounted on the vehicle;
   a substrate disposed inside the housing;
   a push button disposed in the housing to be pressed;
   a dial arranged and configured to be rotated about the push button, being non-peristaltic when the push button is pressed, and maintained in a posture with respect to the housing;
   a first sensor disposed on the substrate to sense pressing of the push button; and
   a second sensor disposed on the substrate to sense rotation of the dial,
   wherein the push button includes a push button support disposed on the substrate and coupled to the housing;
   wherein the dial includes a dial support surrounding a circumference of the push button support and rotatably disposed inside the housing,
   wherein the input apparatus further comprises an elastic support to elastically support the rotation of the dial support about the housing, and
   wherein the elastic support includes:
   a cam groove including a first inclined surface and a second inclined surface connected with an end portion of the first inclined surface, the cam groove defined in the dial support;

a contact member disposed in a dial guide groove vertically formed at the housing to be guided to move vertically so that the contact member is able to contact the first inclined surface or the second inclined surface corresponding to a rotation direction of the dial support; and an elastic member received inside the dial guide groove and a groove vertically formed at the contact member to elastically support the contact member such that the contact member elastically contacts the first inclined surface or the second inclined surface.

2. The input apparatus of claim 1, wherein the push button further includes a push button body coupled to the push button support movably in a vertical direction and exposed to an outside of the housing.

3. The input apparatus of claim 2, wherein a guide rib is arranged at a lower portion of the push button body, and wherein the push button support has a guide groove to movably receive the guide rib in the vertical direction.

4. The input apparatus of claim 2, wherein a push protrusion is arranged at a lower end of the push button body;

wherein the first sensor includes a tact switch disposed under the push protrusion; and wherein the pressing of the push button is sensed when the push protrusion pushes the tact switch.

5. The input apparatus of claim 2, further comprising a push knob having a symbol and coupled to an upper end of the push button body, wherein the push knob is non-peristaltic and has a posture maintained with respect to the housing, when the dial is rotated.

6. The input apparatus of claim 2, wherein the dial further includes:

a dial body surrounding a circumference of the push button body, and disposed above the push button support, wherein the dial support is coupled to the dial body to surround a circumference of the push button support and rotatably disposed inside the housing.

7. The input apparatus of claim 6, wherein the dial support includes a magnet, wherein the second sensor includes hall sensors spaced apart from each other in a circumferential direction of the dial support, and wherein the hall sensors sense the rotation of the dial by sensing the magnet.

8. The input apparatus of claim 6, further comprising a rotation restrictor to restrict the dial support from being rotated about the housing to a specific extent or more.

9. The input apparatus of claim 8, wherein the rotation restrictor includes:

a locking groove defined in an outer circumferential surface of the dial support in a circumferential direction of the dial support; and a stopper protrusion disposed on an inner surface of the housing, received in the locking groove, and selectively locked to one end or an opposite end of the locking groove corresponding to the rotation of the dial support.

* * * * *